Patented Dec. 1, 1936

2,062,677

UNITED STATES PATENT OFFICE 2,062,677

COMPOSITIONS OF MATTER AND PETROLEUM PRODUCTS AND METHOD OF MAKING SAME

Orland M. Reiff, Woodbury, N. J., assignor to Socony-Vacuum Oil Company, Incorporated, New York, N. Y., a corporation of New York No Drawing. Application June 8, 1935, Serial No. 25,641

11 Claims. (Cl. 87—9)

This invention relates to improved pour point depressants or substances capable of lowering the temperature at which a hydrocarbon oil comprising a substantially homogeneous mixture of liquid oils and waxy solids undergoes loss of fluidity. The invention also contemplates the provision of novel compositions of matter.

Among the principal objects of the present invention is the provision of improved pour point depressants and improved products comprising petroleum oils in combination therewith. Other objects and advantages will appear from the more detailed description of my invention as set forth herein.

Pour point depressants heretofore known comprise certain alkyl-substituted aromatic hydrocarbons and certain alkyl-substituted chlorinated aromatic hydrocarbons. Of these a few specific alkyl-substituted aromatic hydrocarbons are described in U. S. Patent 1,815,022. In my co-pending application Serial Number 23,025, I have described other pour point depressants which are made by condensing or resinifying the above-mentioned alkyl-substituted aromatic hydrocarbons (and also others belonging to a class or group defined in my said co-pending application) with a resinifying agent, preferably in the presence of, or intimately admixed with a suitable solvent such as glacial acetic acid, and a catalyst such as concentrated sulfuric acid, to promote the speed and completeness of the resinifying reaction.

I have now discovered that highly efficient pour point depressants, which are to some extent similar to those described in my said co-pending application, but which for the purposes and objects of the present invention are not identical therewith, in all respects, may be prepared by resinifying aromatic hydrocarbons such as, for example, naphthalene, anthracene, phenanthrene, fluorene, diphenyl, benzene, toluene, xylene and the like, or mixtures of these, with a suitable resinifying agent, and condensing the product thus obtained, preferably after purification, with chlorinated aliphatic hydrocarbons of relatively high molecular weight, this condensation being carried out in accordance with the well-known method of the Friedel-Crafts reaction.

The chlorinated aliphatic hydrocarbons referred to and the methods of their preparation are also described in my co-pending application referred to above. These latter products comprise the chlorinated petroleum naphthas, kerosenes, heavy oils such as gas oils and lubricants, petrolatum, and crystalline waxes, and/or similar hydrocarbons derived from other sources, but more especially the chlorinated paraffin waxes.

In the practice of my invention I prefer to proceed in accordance with the following example:

I first prepare naphthalene-formaldehyde resin and chlorinated paraffin wax. For convenience I shall first describe the preparation of the chlorinated paraffinic petroleum wax hereinafter referred to as chlorwax. Paraffinic petroleum wax having an A. S. T. M. melting point of about 130° F. is melted by heating and held at a temperature of approximately 180° to 200° F., and chlorine gas is bubbled through the molten wax until the latter has absorbed or combined with about 12% of its weight of chlorine. This gives a product the composition of which approximates that of a monochloroparaffin, hereinafter referred to as monochlorwax.

I prepare a naphthalene-formaldehyde resin by heating an intimate mixture of naphthalene, trioxymethylene (as a source for supplying the formaldehyde), glacial acetic acid and concentrated sulphuric acid, the proportions of these ingredients being about as follows:

*Resinification reaction mixture*

| | |
|---|---|
| Naphthalene_____grams__ | 50 |
| Glacial acetic acid_____cc__ | 50 |
| Concentrated sulphuric acid_____cc__ | 20 |

(Trioxymethylene sufficient to give ½ gram molecular weight of formaldehyde for each gram molecular weight of naphthalene.)

The resinification process is carried out at a temperature of about 50° C., preferably somewhat less than this temperature, and the heating is continued until the resinifying action is complete, which ordinarily requires about one hour. The naphthalene resin thus produced is then purified by dissolving in benzene and washing with water containing a water-soluble alkali to free the product from acid. The benzene is then removed by distillation and the remaining residue heated further to remove any excess or unreacted naphthalene. The product thus obtained as a residue is a light colored resin which readily softens upon warming.

I next condense the chlorwax and naphthalene-formaldehyde resin prepared as described above, in accordance with the well-known Friedel-Crafts method by dissolving a mixture of these two compounds in ethylene dichloride and then slowly adding powdered aluminum chloride to this solution, the rate of addition of the aluminum chloride being regulated in such a manner as to avoid excessive foaming of the solution due to the evolution of hydrochloric acid gas from the mixture. During the addition of the aluminum chloride to the solution of chlorwax and napthalene resin in the ethylene dichloride, the temperature of the solution is held at approximately room temperature. After the requisite amount of the aluminum chloride is added to the solution the temperature of the resulting mixture is then raised to about 180° F., and held at this temperature until the reaction is complete, which ordinarily requires about one hour. During the process just described, and particularly while the mixture is being heated at the higher temperature specified, vapors of ethylene dichloride are evolved from the mixture. These vapors may be condensed by means of a reflux condenser or other suitable means while the reaction is proceeding and returned to the reaction mixture. The entire process can be carried out under atmospheric pressure.

The proportions of chlorwax, naphthalene resin, aluminum chloride and ethylene dichloride employed in this condensation process are preferably as follows:

Friedel-Crafts reaction mixture

| | |
|---|---|
| Chlorwax | grams 100 |
| Naphthalene resin | do 11.2 |
| Aluminum chloride | do 4 |
| Ethylene dichloride | cc 100 |

After the reaction is completed the aluminum chloride which is present in the reaction mixture, as a sludge, is allowed to settle out and the liquid reaction product is removed and washed with water containing a water-soluble alkali to remove the aluminum chloride from the mixture. The ethylene dichloride is then separated from the reaction mixture by distillation, and any excess of unreacted wax also removed by heating the residue under a vacuum of about 5 mm. at a temperature of about 350° C.

I have discovered that the final product obtained in the manner just described is a pour point depressor of high efficiency. It is viscous and resinous and also possesses a satisfactory clear color, making it highly desirable for blending with light colored mineral oils for the purpose of reducing the pour point of such oil. The unusually high effectiveness of this product as a pour point depressor is illustrated in the following table which sets forth the A. S. T. M. pour points of a wax-bearing lubricating petroleum oil with and without the addition of the improved pour point depressant produced in accordance with the above example of my invention and also the pour points of the same lubricating oil containing definite amounts of previously known alkyl-substituted aromatic hydrocarbon pour point depressors referred to above. The petroleum wax-bearing lubricating oil referred to in the table has a viscosity of 249 seconds Saybolt universal at 130° F.

| Original oil—Saybolt viscosity of 249 sec. @ 130° F. | Concentration of depressor in oil | A. S. T. M. pour test |
|---|---|---|
| | Percent | |
| Without depressor | 0 | +20° F. |
| With improved depressor of present invention | ⅛ | −25° F. |
| With improved depressor of present invention | ⅟₁₆ | −20° F. |
| With improved depressor of present invention | ⅟₃₂ | 0° F. |
| With alkyl-substituted aromatic hydrocarbon pour point depressor | ½ | −5° F. |
| With alkyl-substituted aromatic hydrocarbon pour point depressor | 1 | −20° F. |

An inspection of the foregoing shows that the addition of a very small amount of the improved pour point depressor of the present invention to the original oil is sufficient to produce a decided lowering of the pour point of the original oil and that the amount of the previously known alkyl-substituted aromatic hydrocarbon pour point depressors which it is necessary to add to the oil to produce a lowering of the pour point which is in any wise comparable is many times greater.

It will be understood that my invention is not restricted to the details of the specific example of my invention given above, but various changes may be made therein without departing from the true scope of my invention as set forth in the appended claims. Thus, for instance, I may use other aromatic hydrocarbon-formaldehyde resins in place of the naphthalene formaldehyde resin described in the example, such as the formaldehyde resin of anthracene, benzene, phenanthrene, fluorene, diphenyl, toluene, xylene and the like, or the formaldehyde resins of mixtures of any of these aromatic hydrocarbons, or I may use other aldehyde resins of naphthalene or of the aromatic hydrocarbons referred to above, such as naphtalene-acetaldehyde resin, anthracene-acetaldehyde resin; etc., or I may use the corresponding sulphur resins of these same compounds. The method of preparing these other non-preferred aromatic hydrocarbon resins is in general very similar to that described in the example of my invention given above for the preparation of naphthalene-formaldehyde resin, but it will be understood, however, that suitable adjustments may be made in the composition of the resinification reaction mixture and also in the conditions under which the reaction is carried out when these other substances are used, all in accordance with methods which will be obvious to those skilled in this art.

The sulphur resins referred to are easily made and are suitable for certain purposes in connection with my invention, but in general are less desirable than the aldehyde resins and particularly formaldehyde resins, for the reason that the sulphur resins have an undesirable dark color and are therefore less suitable for the production of depressors in accordance with my invention which are intended for blending with light colored mineral oils.

Also I may employ other chlorwaxes or other chlorinated aliphatic hydrocarbons in place of the monochlorwax specified in the example of my invention given above. Thus, while I prefer, in the practice of my invention, to employ a chlorwax, or other chlorinated aliphatic hydrocarbon as defined above, containing about 12% chlorine, and corresponding approximately to monochlorwax as specified in the above example, I may employ other chlorwax containing other proportions of chlorine to the wax, or other aliphatic hydrocarbons, without departing from my invention. Thus I may employ with good results, a chlorinated wax or other chlorinated aliphatic hydrocarbon containing as little as say 9% and as much as about 18% of chlorine to the wax or other aliphatic hydrocarbon. If excessively large proportions of chlorine are employed, there is a tendency to reduce the amount of desired aliphatic substituents of relatively high molecular weight and to produce undesirable side reactions.

Also the Friedel-Crafts condensation reaction may be carried out at a somewhat higher temperature than that specified in the above illustrative example as, for instance, at a temperature of about 180° F. This procedure results in the completion of the condensation reaction in a substantially shorter period of time but ordinarily it also results in a more rapid evolution of hydrochloric acid gas resulting in a frothing of the mixture. To overcome this objection it is desirable to add the aluminum chloride to the reaction mixture in the form of a slurry or suspension of the aluminum chloride in the ethylene dichloride solvent whereby the rate of addition of the catalyst may be more readily controlled with a resulting regulation of excessive foaming.

Also the Friedel-Crafts reaction may be carried out without the use of the ethylene dichloride as specified in the above example, or other similar solvent, in which case the reaction mixture should be heated to a temperature sufficiently high to keep the chlorwax or other chlorinated aliphatic hydrocarbon in the liquid state. Where chlorwax is employed without the solvent this temperature should be in the neighborhood of about 300° F. However, it will be understood that I prefer to use ethylene dichloride or other similar solvent and to carry out the reaction at a temperature below the boiling point of such solvent. Also the amount of the ethylene dichloride or other suitable solvent may be varied, but it is desirable to use an amount sufficient to effect complete solution of the resin and the chlorwax or other chlorinated aliphatic hydrocarbon, at room temperature.

The alkyl-substituted resinified aromatic hydrocarbons referred to above may be prepared from mixtures of resinified aromatic hydrocarbons and chlorinated aliphatic hydrocarbons containing as little as say 35 grams, or slightly more, of chlorine per gram molecular weight of unresinified aromatic compound, represented by the resin, corresponding approximately to a mono-substituted aromatic hydrocarbon. Also, they may be prepared from mixtures containing a greater proportion of chlorine, up to a proportion sufficient to saturate the aromatic compound. Mixtures throughout the range just stated result in pour point depressants, made in accordance with this invention, which possess good properties of solubility in petroleum lubricating oils and stability for use in automobile engines.

I claim:

1. As a new composition of matter a hydrocarbon oil composition of low pour point comprising a hydrocarbon oil of normally high pour point and in combination therewith a small amount, sufficient to depress the pour point thereof, of the oil-miscible synthetic resinous material produced by first treating a substance selected from the group consisting of naphthalene, anthracene, diphenyl, phenanthrene and fluorene with a resinifying reagent of aldehyde nature to form a resin, and subsequently condensing the resin product with chlorinated paraffin wax in the presence of a catalyst of the nature of aluminum chloride.

2. As a new composition of matter a hydrocarbon oil composition of low pour point comprising a hydrocarbon oil of normally higher pour point, and in combination therewith a small proportion, sufficient to substantially reduce the pour point, of a resinous condensation product comprising the reaction product of aromatic hydrocarbon material condensed with a resinifying agent capable of resinifying the material, and subsequently condensed with halogenated aliphatic hydrocarbon material of relatively high molecular weight in the presence of a catalyst.

3. As a new composition of matter a hydrocarbon oil composition of low pour point comprising a hydrocarbon oil of normally higher pour point, and in combination therewith a small proportion, sufficient to substantially reduce the pour point but not in excess of 1%, of a resinous condensation product comprising the reaction product of aromatic hydrocarbon material condensed with a resinifying agent capable of resinifying the material, and subsequently condensed with chlorinated wax in the presence of a catalyst.

4. As a new composition of matter a hydrocarbon oil composition of low pour point comprising a hydrocarbon oil of normally higher pour point, and in combination therewith a small proportion, sufficient to substantially reduce the pour point, of a resinous condensation product comprising the reaction product of aromatic hydrocarbon material selected from the group consisting of naphthalene, anthracene, diphenyl, phenanthrene, and fluorene, condensed with a resinifying agent capable of resinifying the material and subsequently condensed with chlorinated aliphatic hydrocarbon material of relatively high molecular weight in the presence of a catalyst of the nature of aluminum chloride.

5. As a new composition of matter a hydrocarbon oil composition of low pour point comprising a hydrocarbon oil of normally higher pour point, and in combination therewith a small proportion, sufficient to substantially reduce the pour point, of a resinous condensation product comprising the reaction product of aromatic hydrocarbon material condensed with a resinifying agent capable of resinifying the material, and subsequently condensed with halogenated aliphatic hydrocarbon material of relatively high molecular weight in the presence of a catalyst, the proportion of the chlorinated aliphatic hydrocarbon being not substantially less than that corresponding to the mono-substituted aromatic material and not substantially greater than that corresponding to complete saturation of the aromatic material.

6. As a new composition of matter a hydrocarbon oil composition of low pour point comprising a hydrocarbon oil of normally higher pour point, and in combination therewith a small proportion, sufficient to substantially reduce the pour point, of a resinous condensation product comprising the reaction product of aromatic hydrocarbon material condensed with a resinifying agent capable of resinifying the material and selected from the class consisting of aldehydes and sulphur compounds, and subsequently condensed with halogenated aliphatic hydrocarbon material of relatively high molecular weight in the presence of a catalyst.

7. As a new composition of matter a hydrocarbon oil composition of low pour point comprising a hydrocarbon oil of normally higher pour point, and in combination therewith a small proportion, sufficient to substantially reduce the pour point, of a resinous condensation product comprising the reaction product of aromatic hydrocarbon material condensed with an aldehyde resinifying agent capable of resinifying the material and subsequently condensed with halogenated aliphatic hydrocarbon material of relatively high molecular weight in the presence of a catalyst.

8. As a new composition of matter a hydrocarbon oil composition of low pour point comprising a hydrocarbon oil of normally higher pour point, and in combination therewith a small proportion, sufficient to substantially reduce the pour point but not in excess of 1%, of a resinous condensation product comprising the reaction product of aromatic hydrocarbon material condensed with an aldehyde resinifying agent capable of resinifying the material and subsequently condensed with chlorinated wax in the presence of a catalyst.

9. As a new composition of matter, a lubricant oil composition of low pour point comprising a lubricant oil of normally higher pour point and in combination therewith a small proportion, sufficient to substantially reduce the pour point, of a naphthalene-aldehyde resin condensed with chlorwax in the presence of a catalyst.

10. As a new composition of matter, a lubricant oil composition of low pour point comprising a lubricant oil of normally higher pour point and in combination therewith a small proportion, sufficient to substantially reduce the pour point, of a naphthalene-formaldehyde resin condensed with chlorwax in the presence of a catalyst.

11. As a new composition of matter, a lubricant oil composition of low pour point comprising a lubricant oil of normally higher pour point and in combination therewith a small proportion, sufficient to substantially reduce the pour point, of a naphthalene-formaldehyde resin condensed with chlorwax containing 9% to 18% of chlorine in the presence of a catalyst.

ORLAND M. REIFF.